(12) United States Patent
Enriquez et al.

(10) Patent No.: US 10,104,289 B2
(45) Date of Patent: Oct. 16, 2018

(54) MODULAR CAMERA DRONE

(71) Applicant: SWL Robotics, Inc., Miami, FL (US)

(72) Inventors: Enrique Jesus Enriquez, Miami, FL (US); Carlos Alberto Valencia, Miami, FL (US); Enrique Frecci Enriquez, Miami, FL (US); Ricardo Enriquez, Miami, FL (US)

(73) Assignee: SWL Robotics, Inc., Miami, FL (US)

( * ) Notice: Subject to any disclaimer, the term of this patent is extended or adjusted under 35 U.S.C. 154(b) by 114 days.

(21) Appl. No.: 15/457,530

(22) Filed: Mar. 13, 2017

(65) Prior Publication Data

US 2018/0063429 A1   Mar. 1, 2018

Related U.S. Application Data

(60) Provisional application No. 62/381,973, filed on Aug. 31, 2016.

(51) Int. Cl.
*H04N 5/232* (2006.01)
*G03B 17/08* (2006.01)
*G03B 31/00* (2006.01)
*G03B 37/04* (2006.01)
*B63G 8/00* (2006.01)
*B63G 8/08* (2006.01)
*B63G 8/22* (2006.01)
*H04N 7/18* (2006.01)
*B64C 39/02* (2006.01)
(Continued)

(52) U.S. Cl.
CPC ......... *H04N 5/23238* (2013.01); *B63G 8/001* (2013.01); *B63G 8/08* (2013.01); *B63G 8/22* (2013.01); *B64C 39/024* (2013.01); *G03B 15/006* (2013.01); *G03B 15/03* (2013.01); *G03B 17/08* (2013.01); *G03B 31/00* (2013.01); *G03B 37/04* (2013.01); *H04N 5/2251* (2013.01); *H04N 5/2256* (2013.01); *H04N 7/185* (2013.01); *B63G 2008/002* (2013.01); *B64C 2201/127* (2013.01)

(58) Field of Classification Search
CPC ...... G02B 23/22; G03B 17/08; G03B 15/006; B63G 8/001; B63G 8/08; B64C 39/024; H07N 7/185
See application file for complete search history.

(56) References Cited

U.S. PATENT DOCUMENTS 3,103,195 A * 9/1963 Cousteau ............... B63G 8/06
                                              114/121
4,841,896 A * 6/1989 Fury ..................... B63G 8/001
                                              114/121
(Continued)

*Primary Examiner* — Fernando Alcon
(74) *Attorney, Agent, or Firm* — Kelly & Kelley, LLP

(57) ABSTRACT

A camera drone has an array of eight camera-light units arranged so as to enable capture of photographs and video providing a spherical 360°×360° field of view. Such an expansive field of view enables image capture for use in virtual reality, augmented reality, and similar uses. The camera drone is preferably spherical in shape so as to minimize any obstructions in the expansive field of view. The camera drone is modular with separate but coordinated modules for a main body module, a base module along an equator of the main body, a thruster module, and a camera-light module. The camera drone is also capable of operation in air or water (submersible) having both a tethered and autonomous version.

17 Claims, 14 Drawing Sheets

(51) Int. Cl.
   *G03B 15/00* (2006.01)
   *H04N 5/225* (2006.01)
   *G03B 15/03* (2006.01)

(56) References Cited

U.S. PATENT DOCUMENTS

| | | |
|---|---|---|
| 8,279,266 B2 | 10/2012 | Theobald |
| 9,678,411 B1* | 6/2017 | Harden ................ G03B 17/561 |
| 2002/0036104 A1* | 3/2002 | Kerrebrock ................ B25J 9/08 |
| | | 180/6.2 |
| 2005/0259985 A1* | 11/2005 | Mulvey ................ G03B 17/08 |
| | | 396/427 |
| 2011/0228074 A1* | 9/2011 | Parulski ................ G03B 15/05 |
| | | 348/81 |
| 2012/0153087 A1 | 6/2012 | Collette et al. |
| 2013/0206915 A1* | 8/2013 | Desaulniers .......... B64C 39/024 |
| | | 244/165 |
| 2014/0362176 A1 | 12/2014 | St. Clair et al. |
| 2016/0023761 A1* | 1/2016 | McNally ............... B64C 39/024 |
| | | 29/407.01 |
| 2016/0031275 A1* | 2/2016 | Monroe ................ B60F 3/0007 |
| | | 244/2 |
| 2016/0114887 A1* | 4/2016 | Zhou ........................ B60F 5/02 |
| | | 348/148 |
| 2016/0119541 A1 | 4/2016 | Alvarado-Moya et al. |
| 2016/0129979 A1* | 5/2016 | Rossano ................ B63G 8/001 |
| | | 114/333 |
| 2016/0200415 A1 | 7/2016 | Cooper |
| 2016/0272317 A1 | 9/2016 | Cho et al. |
| 2016/0286128 A1 | 9/2016 | Zhou |
| 2016/0304217 A1 | 10/2016 | Fisher et al. |
| 2016/0370687 A1* | 12/2016 | Xu ......................... G03B 17/08 |
| 2016/0376000 A1* | 12/2016 | Kohstall ................ B64C 37/00 |
| | | 114/313 |
| 2017/0197714 A1* | 7/2017 | Golden ................ B64C 39/024 |

\* cited by examiner

MODULAR CAMERA DRONE

RELATED APPLICATION

This application claims the benefit of U.S. Provisional Application No. 62/381,973, filed on Aug. 31, 2016.

BACKGROUND OF THE INVENTION

The present invention is directed to a modular air-water camera drone. More particularly, it relates to a drone capable of use in air or water mediums, which includes an array of camera-lights configured for capturing 360°×360° views during operation. Such invention has utility in real-time exploration, as well as, live streaming or video capture for virtual reality (VR).

Accordingly, there is a need for a camera drone that addresses these shortcomings and provides improved functionality. The present invention fulfills these needs and provides other related advantages.

SUMMARY OF THE INVENTION

The inventors disclose a new and novel camera drone. In a particularly preferred embodiment, a spherical shaped craft is propelled by a number of thrusters capable of maneuvering it in any direction. The thrusters are designed to operate in any fluid medium from air to water. In a water medium, the craft also includes ballast tanks that can be alternately filled with air or water to alter the buoyancy of the craft.

The spherical nature of the craft allows for mounting a series of camera-lights at pre-determined angles to achieve a full 360°×360° field of view. Such a camera-light configuration allows for video streaming, video recording or real time 360°×360° viewing. The craft can also be equipped with a series of stereoscopic camera-lights at pre-determined angles for the purpose of achieving 360°×360° three-dimensional streaming, video recording or real time viewing.

The craft is designed in a modular fashions such that it can be easily adapted to operate submerged underwater (fresh and sea water) and also operate in air. When being operated in air, the craft is propelled by a series of propellers similar to conventional flying drones. When operating submerged underwater, the craft will preferably use a series of thrusters designed especially for underwater environments, including harsh environments. Both the propellers and the thruster are operated by dual-use motors.

In either mode of operation, the motors (for thrusters or propellers), are preferably connected to a centralized minicomputer located at or near the center of gravity, preferably being the origin of the radius of the spherical shaped craft. The minicomputer is preferably adapted with a digital gyroscope to give the craft the ability to be stabilized and controlled in with computerized functionality. When adapted for underwater use, the craft is preferably equipped with a series of upper and lower (fresh or sea water) tanks that serve as a ballast system to control buoyancy and also to aid the craft achieve angular position underwater by moving ballast water across the tanks. The craft can operate autonomously by incorporating a battery pack inside or it can be tethered by a cable attached to a base unit.

The present invention is directed to a modular camera drone consisting of four modular units. The first module comprises a hermetically sealed housing enclosing a computer processor. A pair of hemispherical shells is disposed around the first module so as to define a generally spherical surface. The second module comprises a circular base unit disposed around an equatorial region of the generally spherical surface and is attached to the first module. The second module includes a plurality of ballast tanks configured for the selective filling or emptying of a ballast fluid. The third module comprises a plurality of thrusters for generating propulsion. The thrusters are disposed uniformly around a perimeter of and attached to the circular base unit. The fourth module comprises a plurality of camera-light units uniformly disposed around the generally spherical surface. Power and control cables from the computer processor pass through the hermetically sealed housing to the second module, the third module, and the fourth module.

The hermetically sealed housing may include a plurality of heat radiating fins disposed about a perimeter of the first module. The camera drone is preferably configured for operation in both air and water environments. In some embodiment, the camera drone may further comprise a tether harness attached to the first module. The tether harness preferably comprises power and control supply cables passing through the hermetically sealed housing to the computer module and a ballast fluid supply cable passing through the hermetically sealed housing to the ballast tanks of the second module. The camera drone may also comprise a battery pack enclosed within the hermetically sealed housing and connected to the computer processor.

The camera drone may further include a gyroscope enclosed within the hermetically sealed housing. The gyroscope is preferably operationally connected to the computer module and the thrusters of the third module. The system may include a plurality of gyroscopes for improved attitude control.

In a particularly preferred embodiment, the fourth module of the camera drone comprises at least eight camera-light units disposed uniformly about the generally spherical surface. This uniform disposal is done so as provide a 360°×360° field of view around the camera drone. The computer processor is configured to process the images from each of the plurality of camera-light units and stitch them together to form a single 360° spherical field of view. Each of the at least eight camera-light units may include a microphone configured to record ambient surround sound.

Each of the plurality of thrusters in the third module includes an electronic speed controller and is capable of generating thrust in both air and water environments. The third module preferably comprises at least four thrusters, each disposed at ninety degree intervals around the perimeter of the circular base unit relative to another thruster.

The second module preferably comprises at least four separate and symmetrical ballast tanks disposed uniformly around the perimeter of the circular base unit. Each of the ballast tanks is preferably configured to be filled with water drawn from a water environment, while releasing any air in the ballast tanks through an air-vent line. Further, each of the ballast tanks is configured to be filled with air drawn from a compressed air tank enclosed within the hermetically sealed housing forcing any water in the ballast tanks through a water flow valve. Alternatively, each of the ballast tanks is configured to be filled with air drawn from a ballast fluid supply cable provided in a tether harness forcing any water in the ballast tanks through a water flow valve.

A sensor configured to measure one of temperature, pressure, depth, or altitude is preferably disposed outside of the hermetically sealed housing. The sensor is preferably disposed behind a strainer unit that permits the passage of an environmental fluid medium to the sensor. In a particularly preferred embodiment, the camera drone includes a plurality of sensor so as to measure all environmental features.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
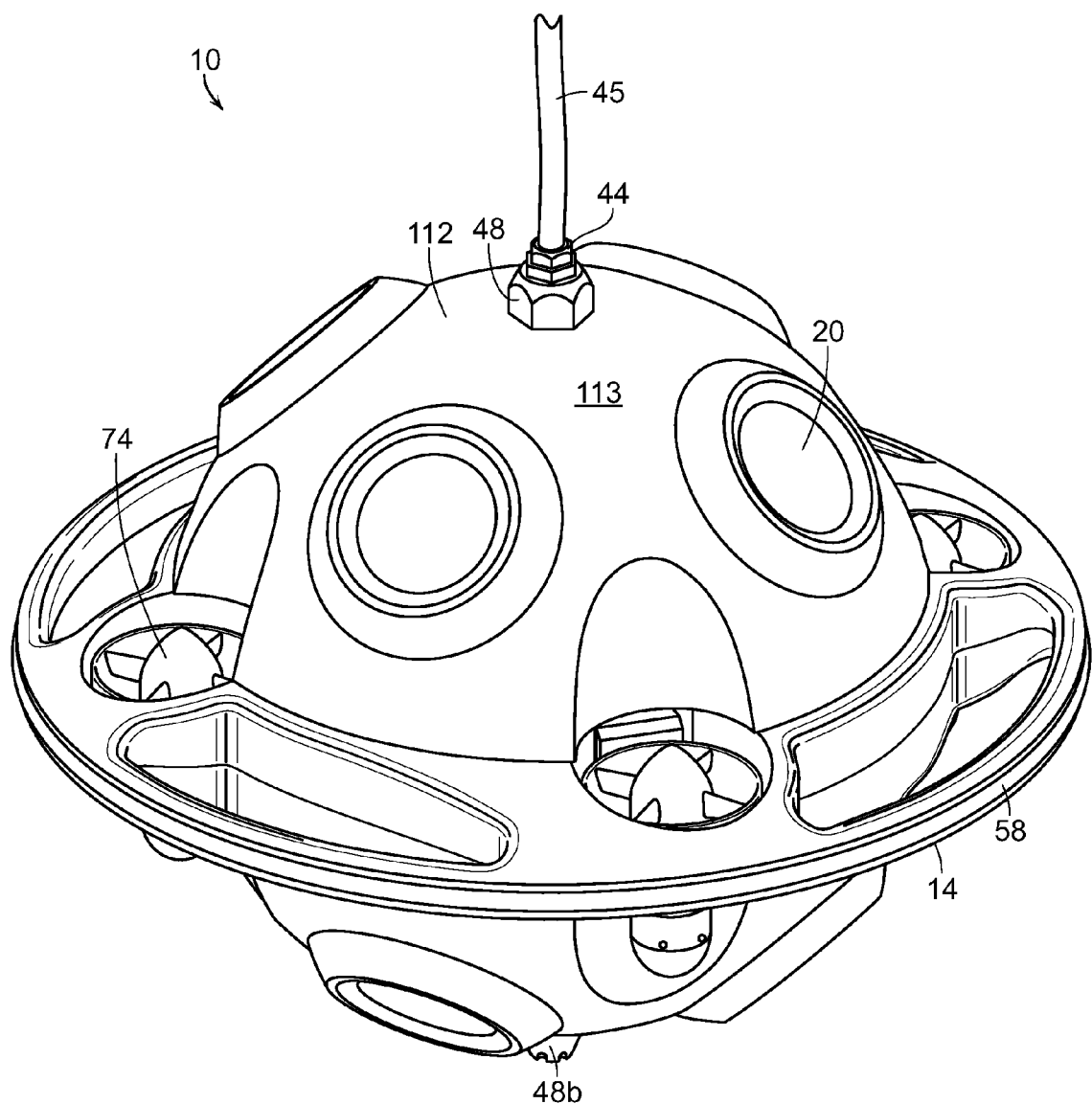
FIG. 1 is a perspective view of the camera drone of the present invention.

In the following detailed description, the camera drone of the present invention is generally referred to by reference numeral 10 in FIGS. 1-14. The primary components of the camera drone 10 include the following modules: a main body module 12, a base module 14, a propulsion module 16, and a camera-light module 18. Each of the main body module 12, base module 14, propulsion module 16, and camera-light module 18 can be assembled in various formats and configurations to complete the inventive camera drone 10.

The modular construction allows the camera drone 10 to be scalable, adjustable and adaptable to different environs, intended uses, and camera/light options. The camera drone 10 preferably has an overall spherical shape so as to allow camera-lights 20 to be arranged in an eight camera-light layout that lends itself to an unobtrusive view, as described more fully below.

Figure 2:
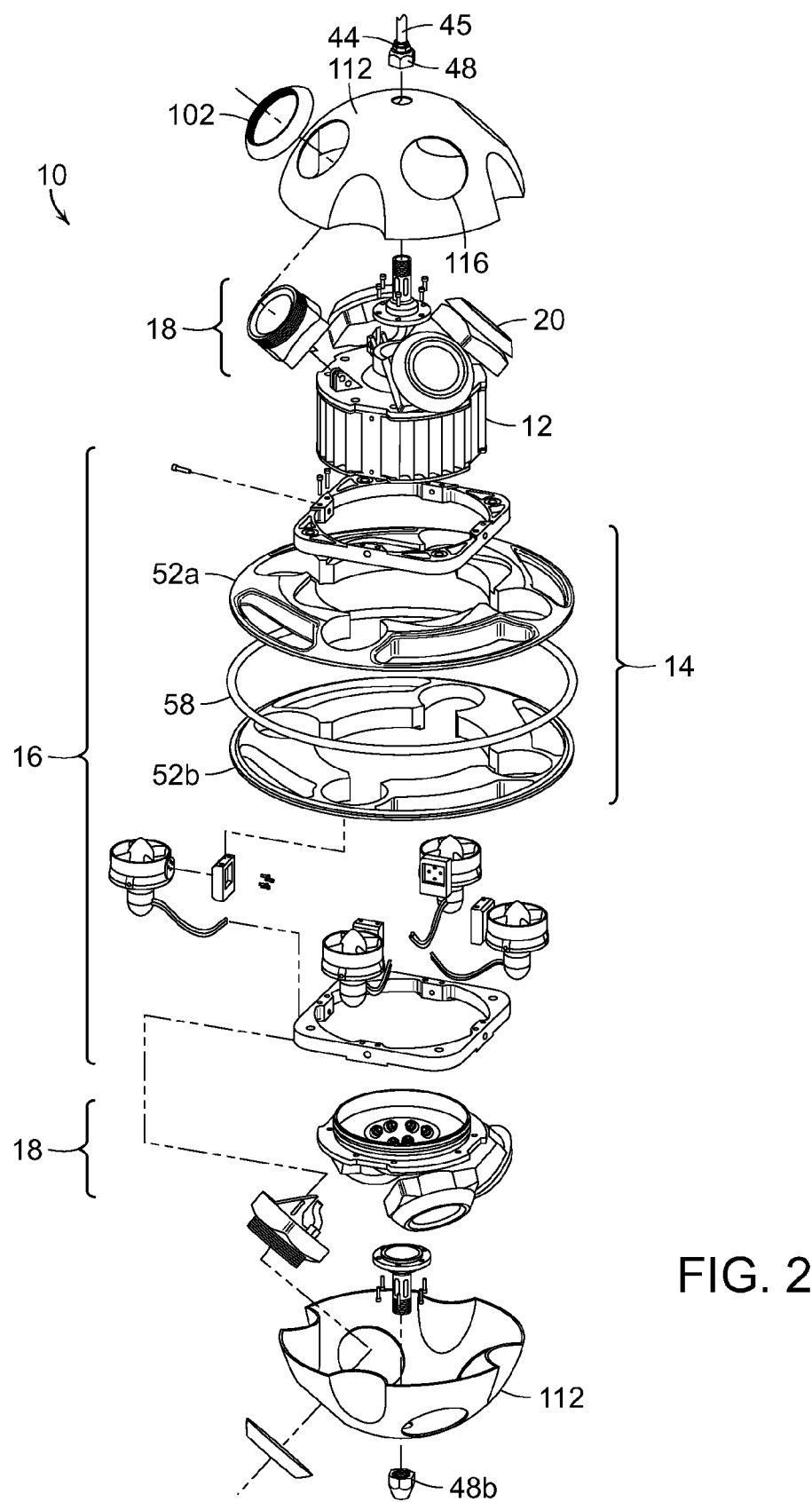
FIG. 2 is an exploded view of the camera drone of the present invention.

FIG. 1 shows the spherical camera drone 10 as fully assembled and tethered. An alternative autonomous version carries a required battery power unit to supply the camera drone 10 with limited power/control time depending upon the capacity of the battery. When tethered, the camera drone 10 will draw power from a remote source. FIG. 2 shows the overall camera drone 10 in an exploded view so as to illustrate how the various modules and components fit together.

First Module—Main Body Module

Figure 3:
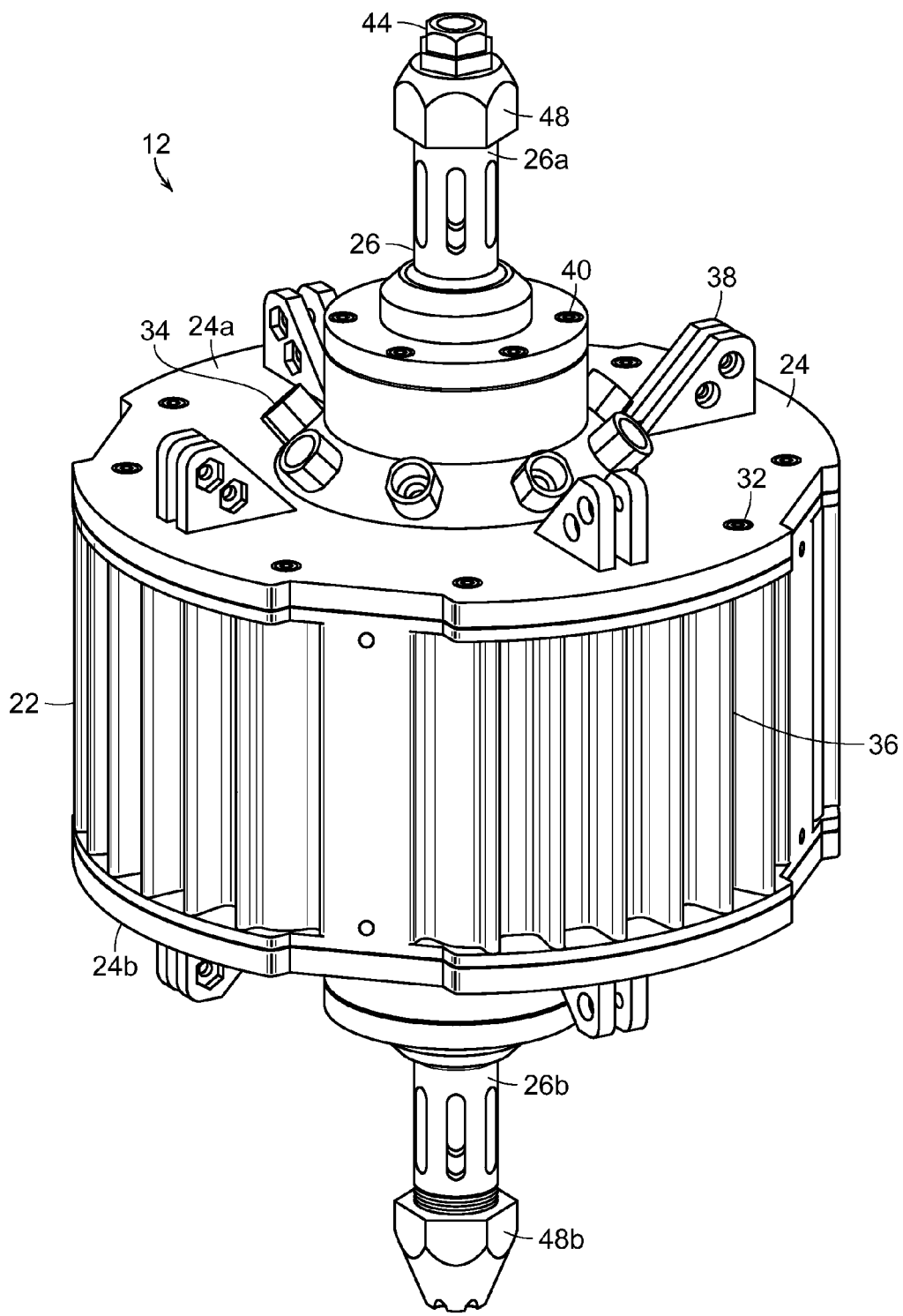
FIG. 3 is a perspective view of module one of the camera drone of the present invention.
Figure 4:
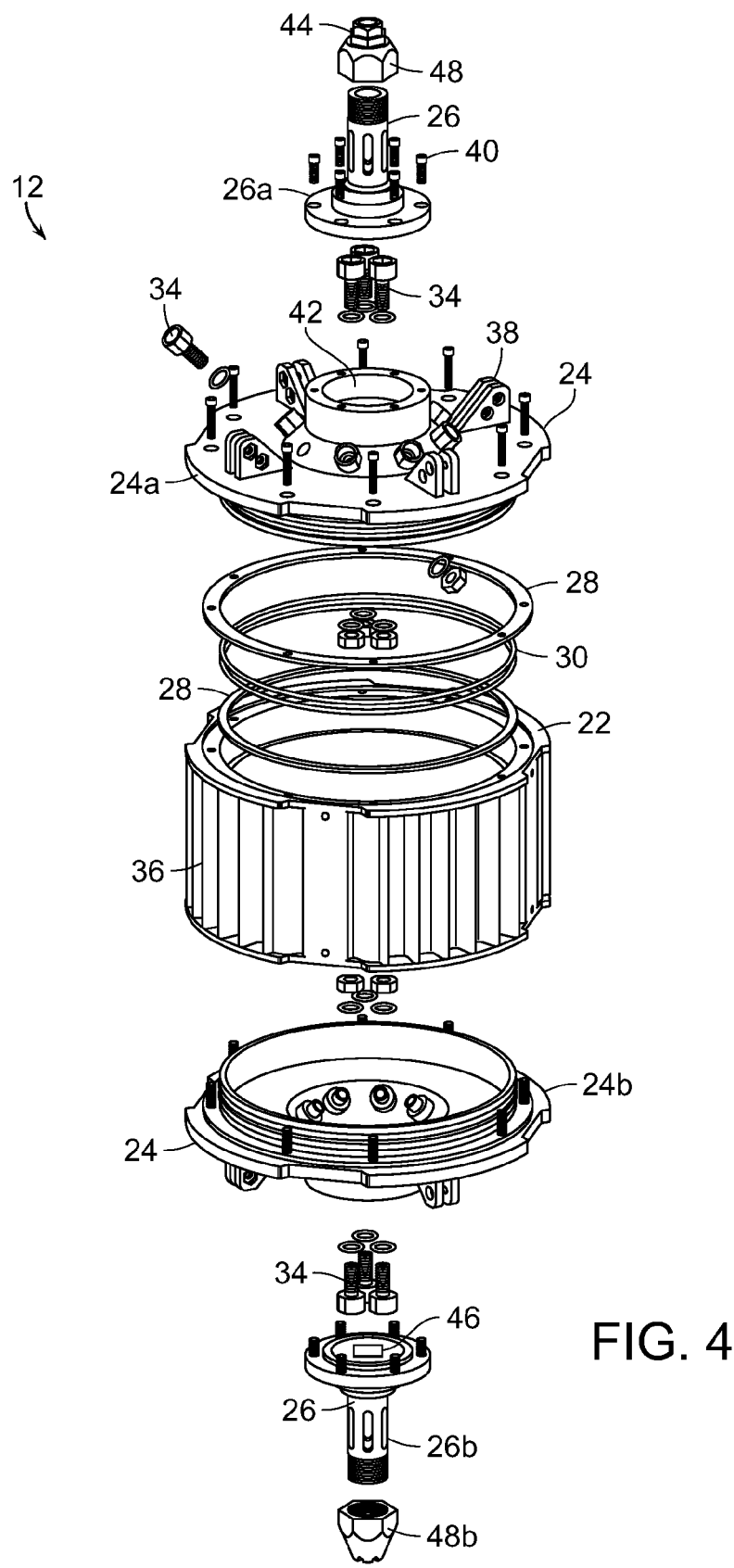
FIG. 4 is an exploded view of module one of the camera drone of the present invention.

The first module or the main body module 12, as shown in FIGS. 3 and 4, is comprised of a generally cylindrical housing 22, upper and lower cylinder covers 24, upper and lower wire stems 26, and its corresponding hardware as described below.

The cylinder covers 24 are preferably symmetrical parts that once attached to the cylindrical housing 22 create a hermetically sealed chamber by using a four level sealing system, as by the use of two flat ring seals 28 and two O-rings 30. Although only illustrated between the upper cylinder cover 24a and the cylindrical housing 22, the same ring seals 28 and O-rings 30 are also used for the lower cylinder cover 24b. Each cylinder cover 24 is then secured to the cylindrical housing 22 by a plurality of cover screws 32 (with or without lock washers) or similar securing mechanism. If used exclusively for airborne flight, the camera drone 10 does not require a strictly water-tight seal as described herein.

The main body module 12 varies in its construction as far as material and material thickness based on weight-to-displacement ratio requirement and the intended operating environment. Length or height of the cylindrical body 22 can vary depending on volume requirements. The main body module 12 utilizes cable penetrators 34 through the cylinder covers 24, a thru-hull water-proof system that allows power and data cables to pass through the covers 24 while maintaining seal integrity.

The upper and lower cable stems 26 are likewise preferably symmetrical parts and attached to covers 24 with an array of bolts 40 and lock-washers. The cable stems 26 are preferably sealed to the upper and lower cylinder covers 24 over the cable penetrators 34 in a water-tight manner. The inner cavity 42 of upper stem 26a is configured to serve as a passage for power cables, data cables and air lines (for submerged tethered version) to meet the cable gland 44 and subsequently a tether harness 45. The lower stem 26b includes an inner cavity 42 that houses one or more sensors 46, including but not limited to temperature, pressure, depth, and similar sensors found in drones. The cable stems 26 are threaded at the ends to accept shell retaining nuts 48. The lower retaining nut 48b is preferably a combination retainer-strainer nut to allow air or strained water into the inner cavity 42 to reach the sensors 46.

Cylinder housing 22 construction, surface shape and material selection, are designed to take advantage of the surrounding environment to create a heat sink effect. In a particularly preferred embodiment, the cylinder housing 22 includes fins 36 or other surface features, which aid in dissipating heat generated by electronic components contained in the cylinder housing 22.

The covers 24 also incorporate a set of stands 38 that serve as adjustable docking bases for the camera-lights 20, as described more fully below. A plurality of cable penetrators 34 are spaced around a perimeter of the cylinder covers 24 so as to provide access from camera-lights 20 mounted on the stands 38 to electronic components contained within the cylindrical housing 22.

Second Module—Base Module

As shown in FIGS. 5-8, the second module is a base module 14 providing a support for the other modules. The base module 14 is preferably disposed on the axes 15a, 15b of the center of the sphere 15, e.g., the center of gravity, of the camera drone 10—with axis 15a being effectively the equator of the camera drone 10. This makes the base module 14 the preferred location for ballast tanks 50 used in the underwater version. As describe more fully below, the thruster module 16 is preferably mounted directly on to the base module 14. The construction of the base module 14 can be achieved using different manufacturing processes and different materials to achieve the ideal weight to power ratio.

The base module 14 is preferably constructed in two upper and lower shells 52. These two shells 52, when joined together form four separate and symmetrical cavities 54 for holding ballast tanks 50 or similar volumes. The joined shells 52 also form a semicircular cavity on the perimeter ring 56, where a rubber bumper 58 is nestled between the shells 52.

In an underwater, tethered version of the camera drone 10, the base module 14 includes a plurality of ballast tanks 50, each of which is equipped with a water flow valve 60, preferably electronically controlled, so as to allow ingress and egress of water to the ballast tanks 50. Each tank is also equipped with an air-vent line 62 that reaches to the surface (as through the tether or similar structure), thus giving the drone 10 the capability for unlimited ballast adjustment from a remote location. By forcing air into the ballast tanks 50 and open activation of the flow valves 60, water is evacuated from tanks 50, thus achieving positive buoyancy. Conversely, by open activation of flow valves 60 and surface venting through the air-vent lines 62, the tanks 50 can be filled with water, thus achieving negative buoyancy. By controlling the ingress and egress of water into each ballast tank 50 individually, angular attitude can also be controlled.

As noted in connection with the main body module 12, construction of every part in the base module 12 will be engineered so that the combination of all modules and ancillary hardware will result in a known mass and volume displacement. Such will preferably be precisely calculated so as to achieve construction of a drone 10 that when all ballast tanks 50 are half full with water achieves a neutral buoyancy state. As explained above, introducing to or evacuating water from the ballast tanks 50 will achieve negative or positive buoyancy respectively.

In an underwater, autonomous version, the same configuration of ballast tanks 50 as the tethered version is assembled. In the autonomous version, a compact electronically controlled water pump 64 is included to control water flow in and out of the tanks 50. Venting is achieved by routing the air-vent line to a compressed air canister 66 housed inside the cylindrical housing 22 of the main body module 12. Each ballast tank 50 preferably contains a combination of electronically controlled flow valves 60 and water pumps 64.

This autonomous version allows the drone 10 to control the craft's buoyancy and angular attitude for a limited number of cycles without any external aid. The number of cycles depends on the capacity of the compressed air canister 66.

Figure 5:
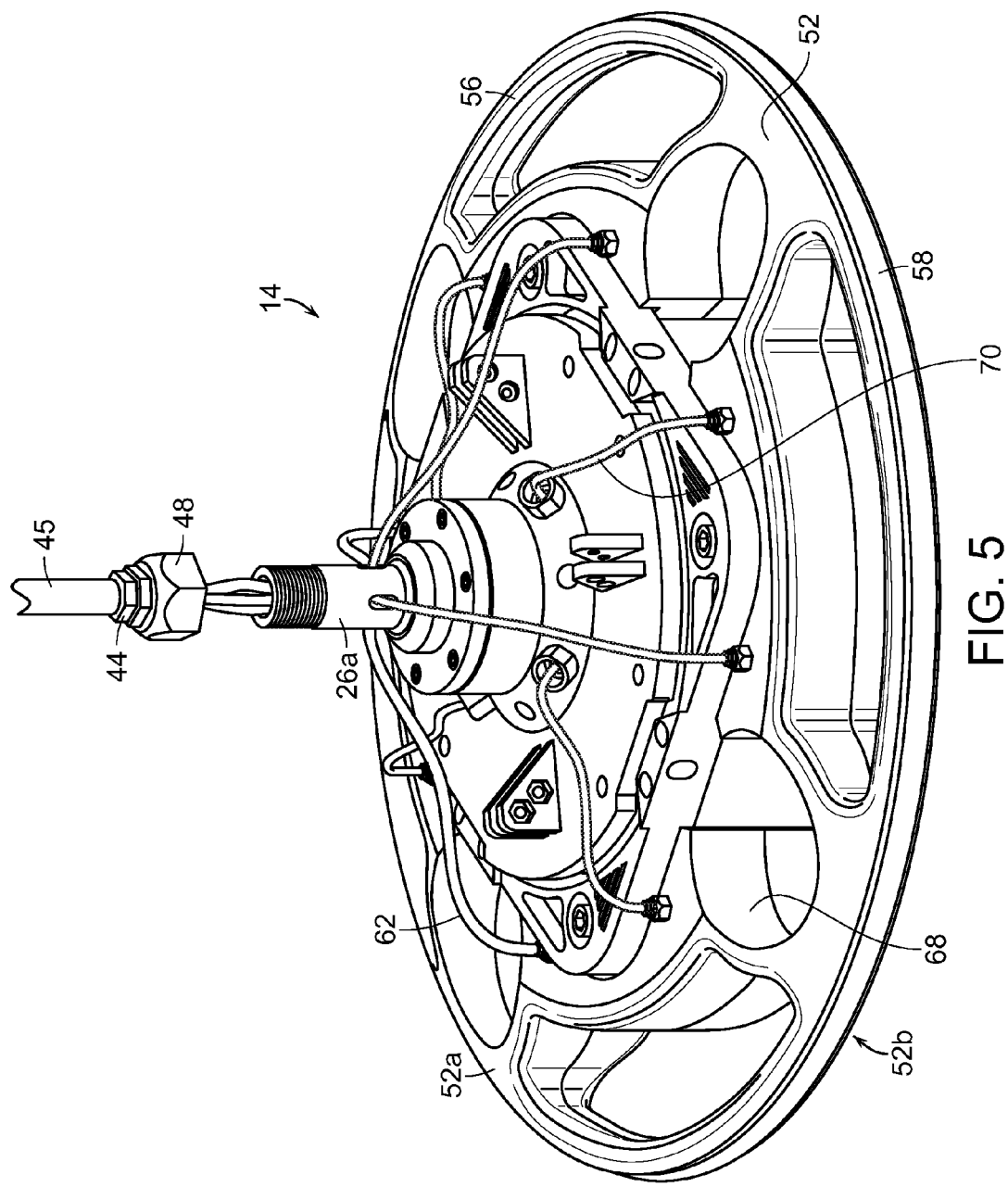
FIG. 5 is a perspective view of module two of the camera drone of the present invention including upper sections from modules one and three.
Figure 6:
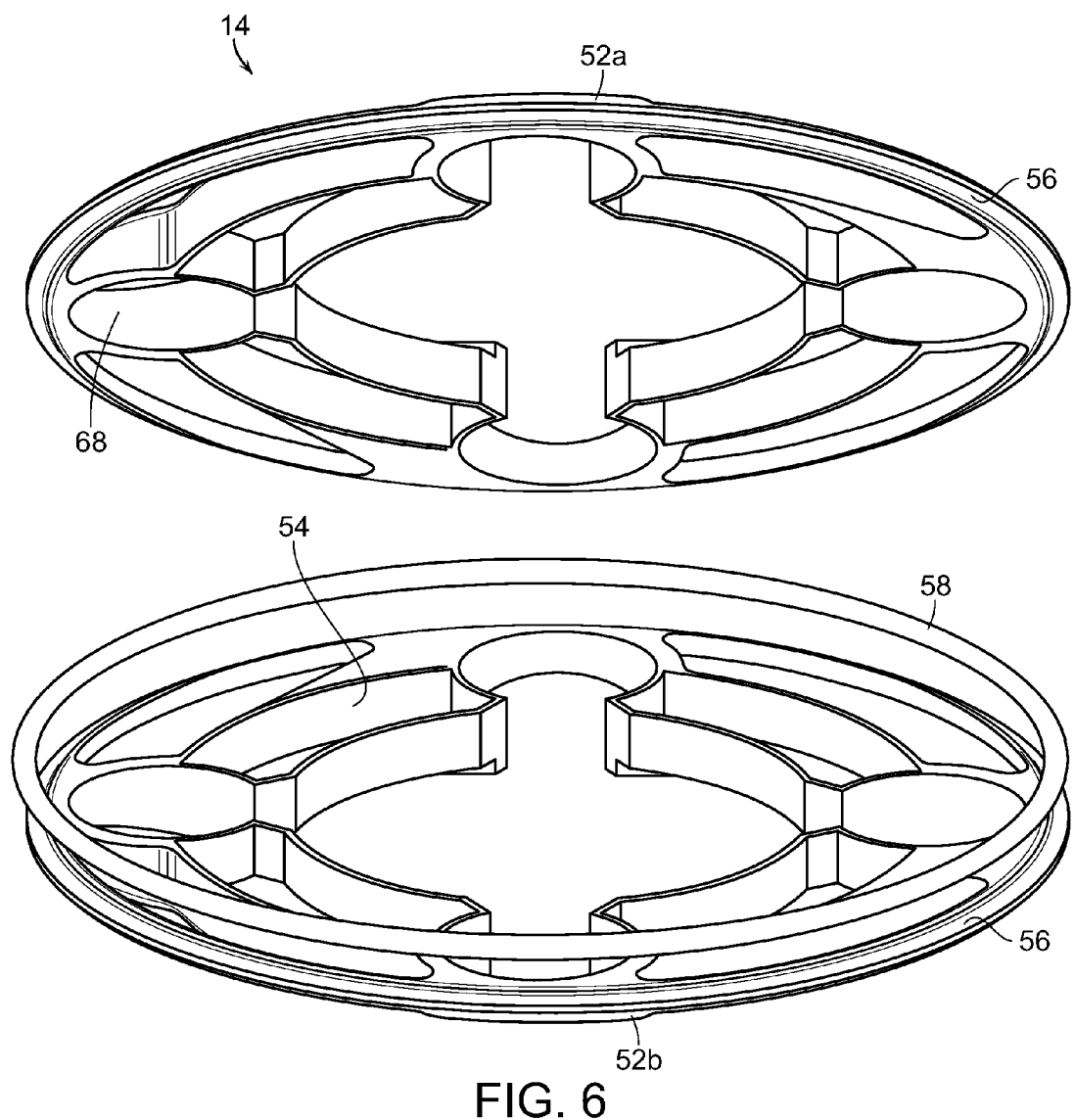
FIG. 6 is an exploded view of module two of the camera drone of the present invention.
Figure 7:
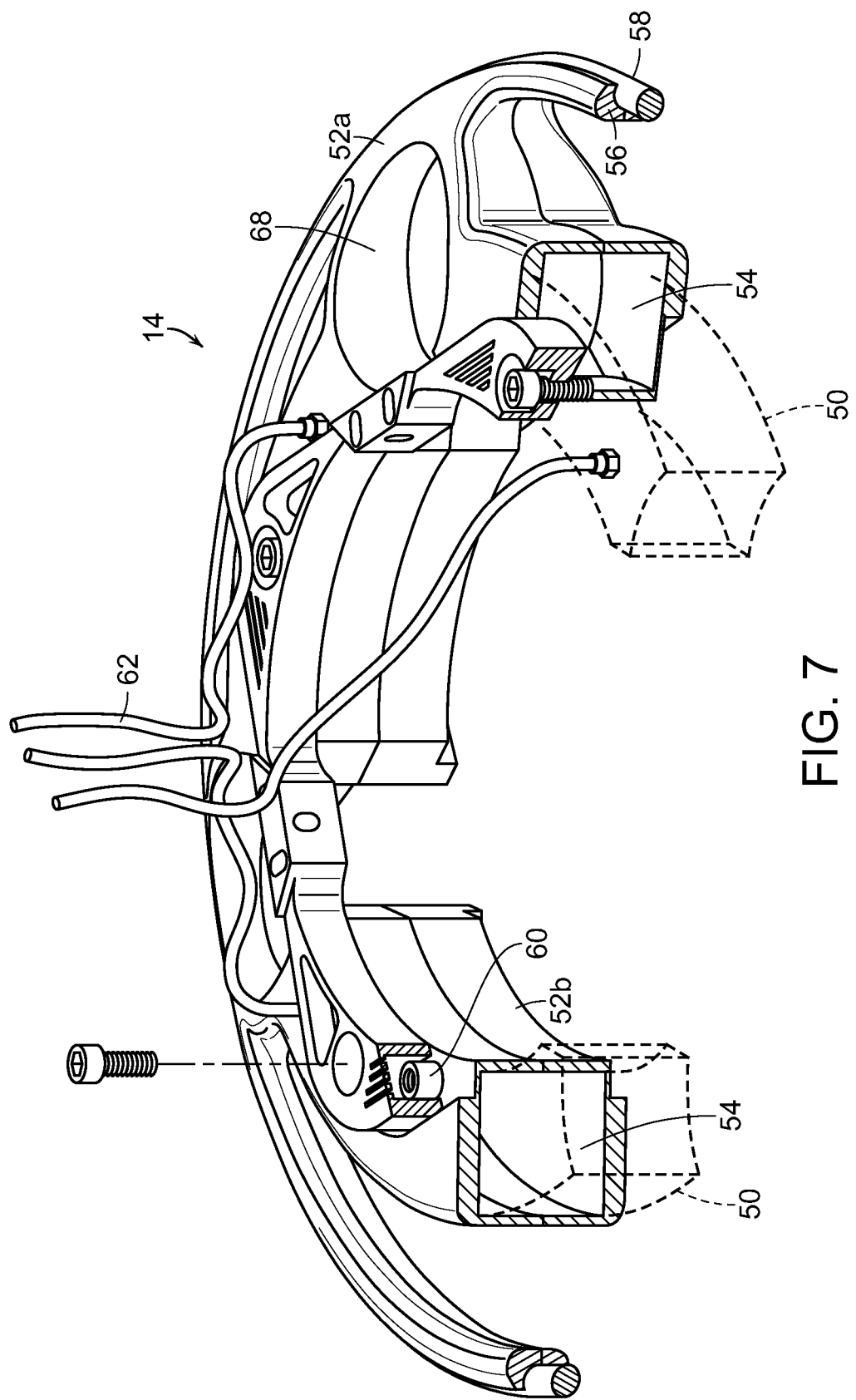
FIG. 7 is a partial cut-away perspective view of module two of the camera drone of the present invention for an underwater tethered version.
Figure 8:
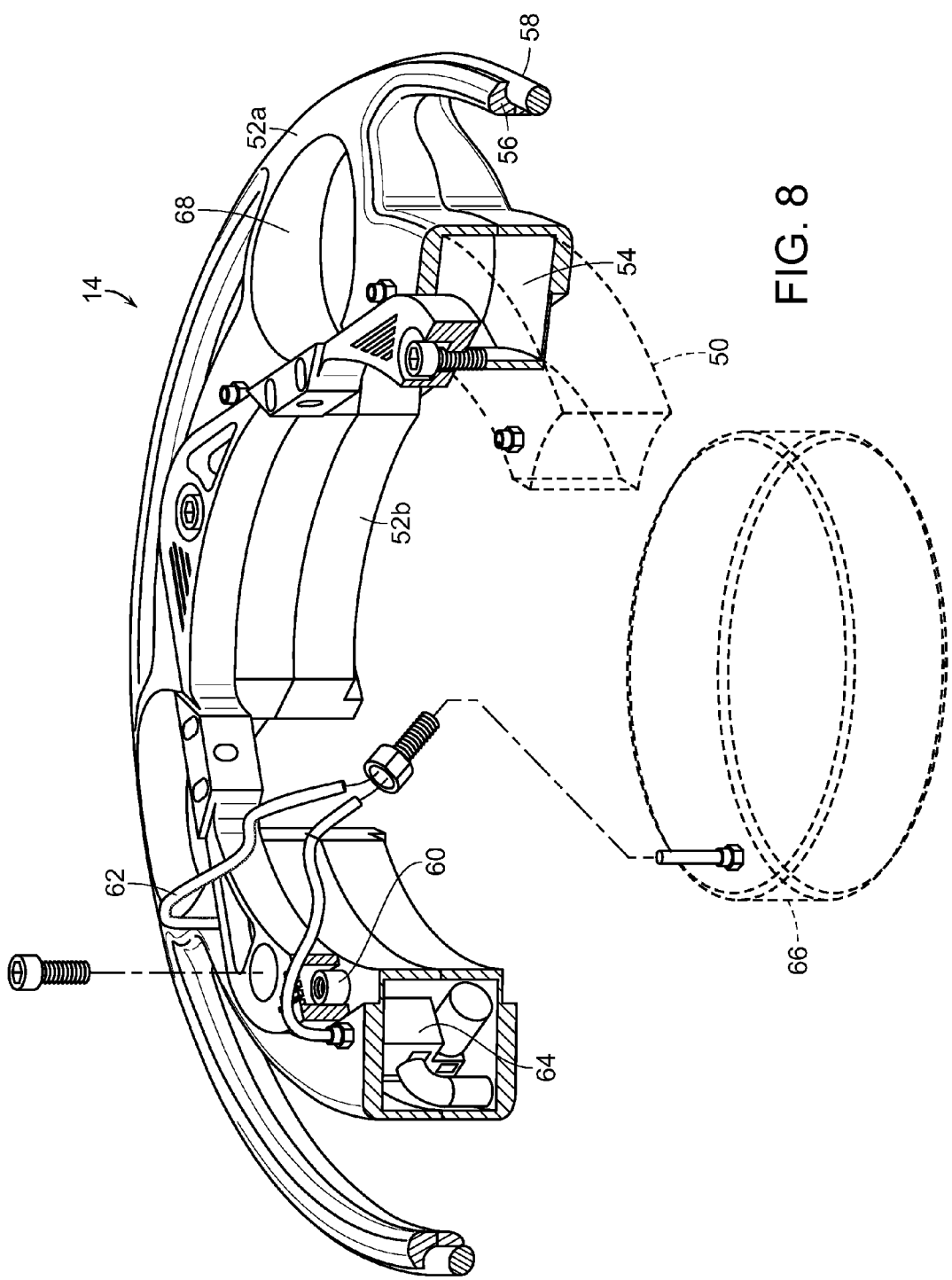
FIG. 8 is a partial cut-away perspective view of module two of the camera drone of the present invention for an underwater untethered version.

FIG. 5 illustrates the integration of the base module 14 with the upper cover 24a of the main body module 12 and the thruster openings 68 for receiving thrusters, as described below. It also shows power-control cables 70 running from the ballast tanks 50 to cable penetrators 34 through the upper cover 24a into the interior of main body module 12, as well as, the air-vent lines 62 also connected to the ballast tanks 50 and passing through the upper wire stem 26a to connect to the tether harness 45 where it may receive or vent atmospheric air. In the untethered version, the air-vent lines 62 will connect to a compressed air canister 66 as described.

Third Module—Thruster Module

Figure 9:
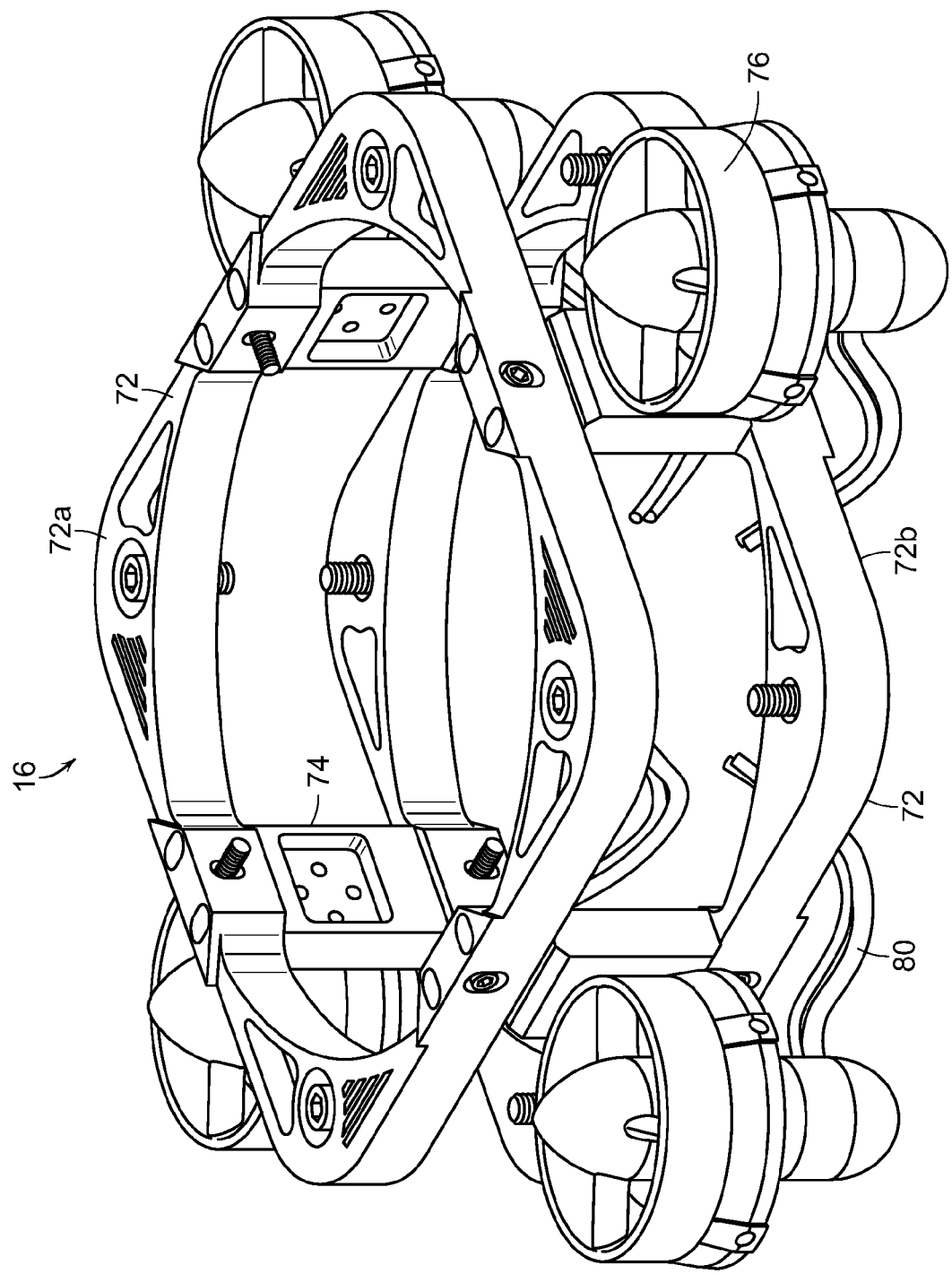
FIG. 9 is a perspective view of module three of the camera drone of the present invention.
Figure 10:
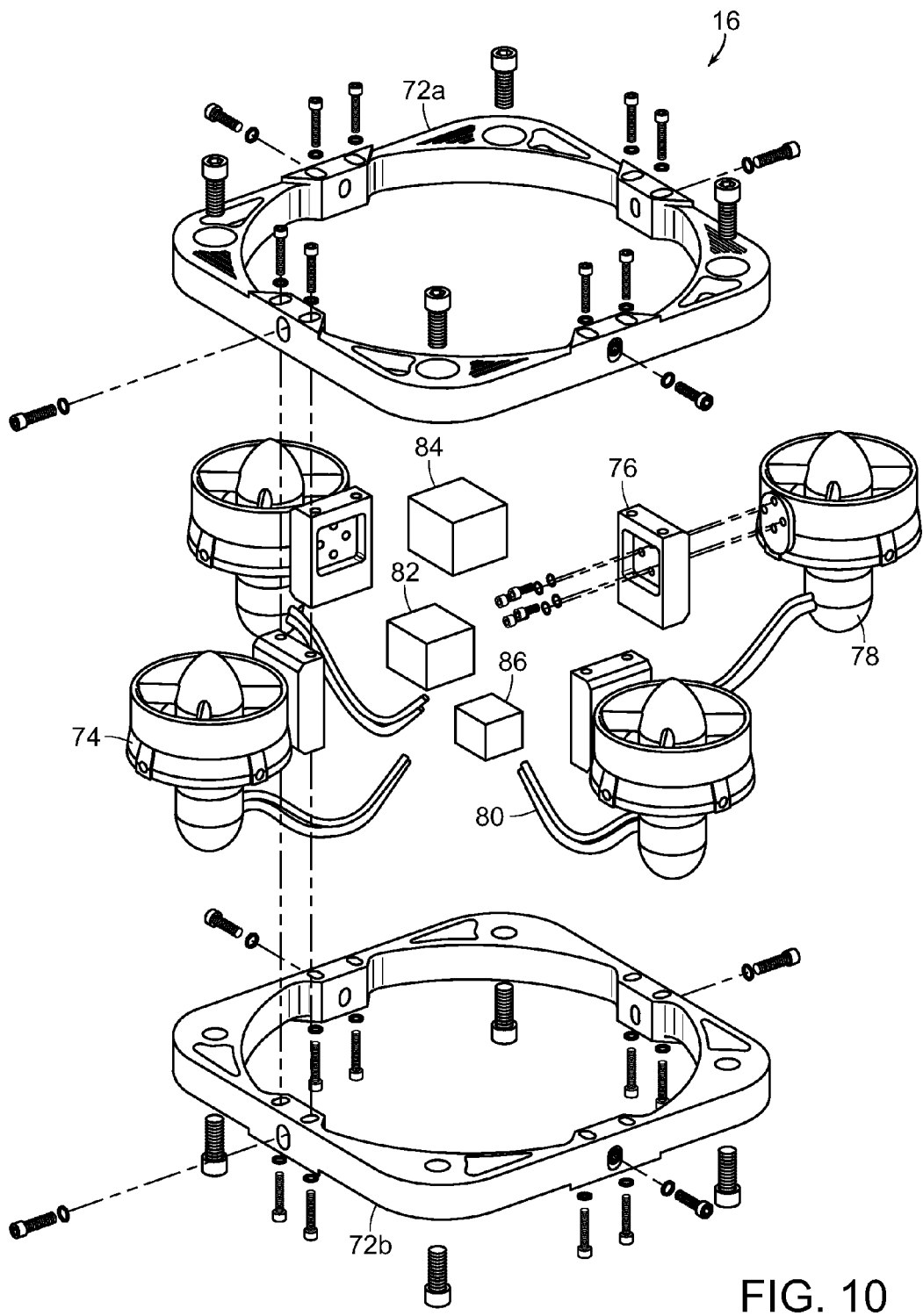
FIG. 10 is an exploded perspective view of module three of the camera drone of the present invention.

FIGS. 9 and 10 generally show the thruster module 16, which generally consists of two main plates (upper and lower) 72. These main plates 72 can be modified to affix different configurations of thrusters 74. In a particularly preferred embodiment, the module 16 consists of at least four thrusters 74—preferably electrical—disposed in areas relative to the four main points of a compass or axes of a Cartesian plane. However, the drone 10 may consist of fewer or more thrusters 74 with the understood trade-offs of decreased control with fewer thrusters 74 and increased weight with more thrusters 74. Each thruster 74 is preferably mounted on a thruster base 76, which is each in turn is fastened to the main plates 72.

Each thruster 74, regardless of the quantity, is preferably controlled individually. The selection of thrusters 74 is determined by performance requirements and working environment. A submersible marine model of the camera drone 10 preferably requires that all components be approved for deep sea water submersion. An electronic speed controller 78 is preferably integrated inside the body of the thruster 74. Cables 80 for power and speed control are routed from each thruster 74 into the cylindrical housing 22 via a cable penetrator 34. Power to run the thrusters 74 may be supplied in one of two different ways. First, power may be supplied through a battery pack unit 82 located inside the cylindrical housing 22 for the autonomous version. Second, power may be supplied through the tether harness 45 connecting to a remote power source (not shown) located on the surface or elsewhere.

All cables 80 are connected to a computer module 84 located inside the cylindrical housing 22. The computer module preferably includes one or more integral gyroscopes 86 also located inside the cylindrical housing 22. Connection of all thrusters 74 and related speed controllers 78 to the computer module 84 allows the camera drone 10 to be controlled, stabilized and maneuvered in any axial direction at different speeds. Pre-planned flight paths and other operations can also be programmed into the computer module 84.

FIG. 9 shows a fully assembled configuration of the thruster module 16 including four thrusters 74. When combined with the main body module 12, the upper and lower main plates 72 completely surround the cylindrical housing 22 in alignment with where the upper and lower covers 24 engage the cylindrical housing 22. When combined with the base module 14, the upper and lower shells 52 also completely surround the cylindrical housing 22 between the upper and lower main plates 72.

Fourth Module—Camera-Light Module

Figure 11:
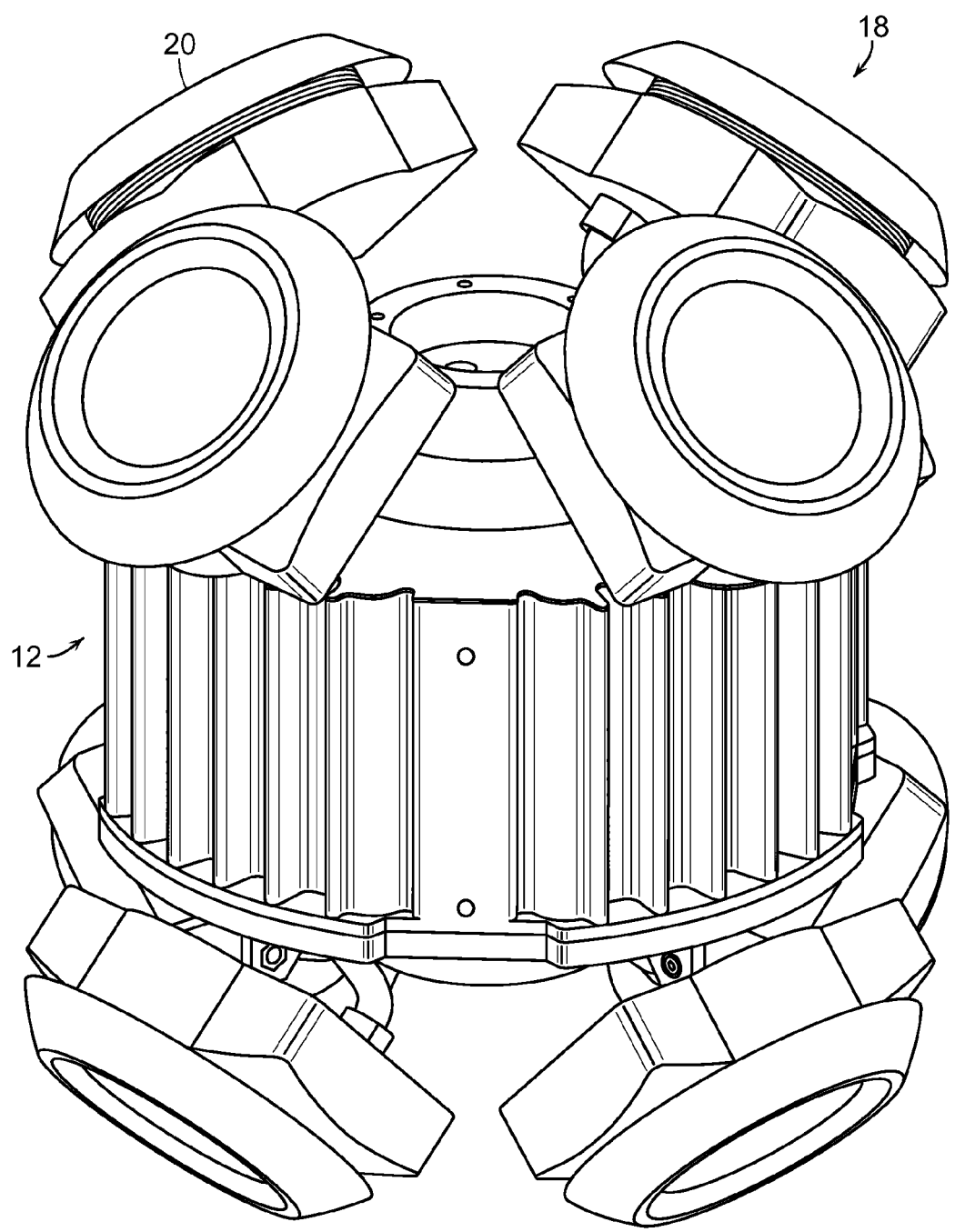
FIG. 11 is a perspective view of module four of the camera drone of the present invention.
Figure 12:
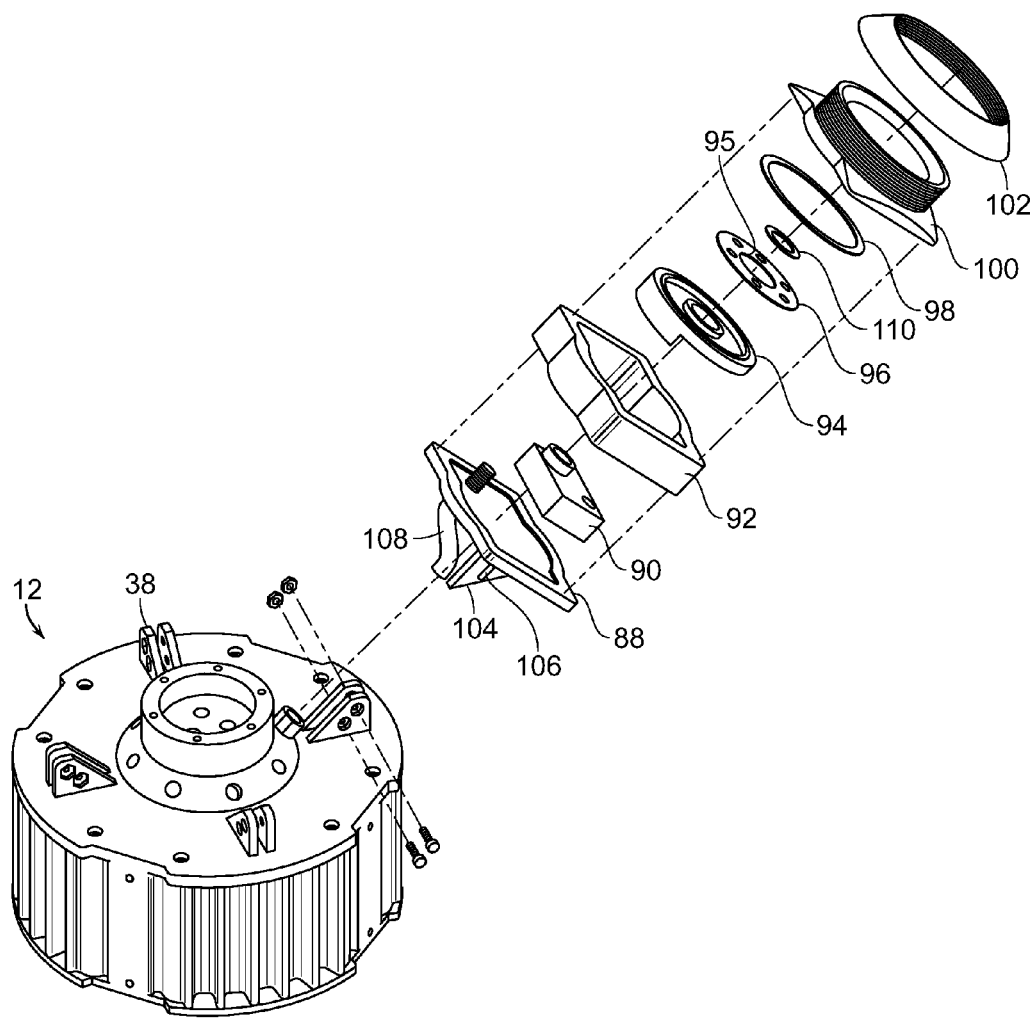
FIG. 12 is an exploded perspective view of one camera-light from module four of the camera drone of the present invention.

FIG. 11 shows the angular position and configuration of an array of camera-lights 20 in the camera-light module 18 relative to the cylindrical housing 22 of the main body module 12. This configuration shows a particularly preferred embodiment of a layout of eight camera-lights 20—oriented with four-up and four-down—each having a maximum viewing angle of one-hundred eighty degrees. Because of the configuration of the other modules, there are no obstructions in the viewing angle for each of the eight camera-lights 20. This configuration allows for near three hundred sixty degree spherical views, having particular application for virtual reality video and/or photography.

Figure 13:
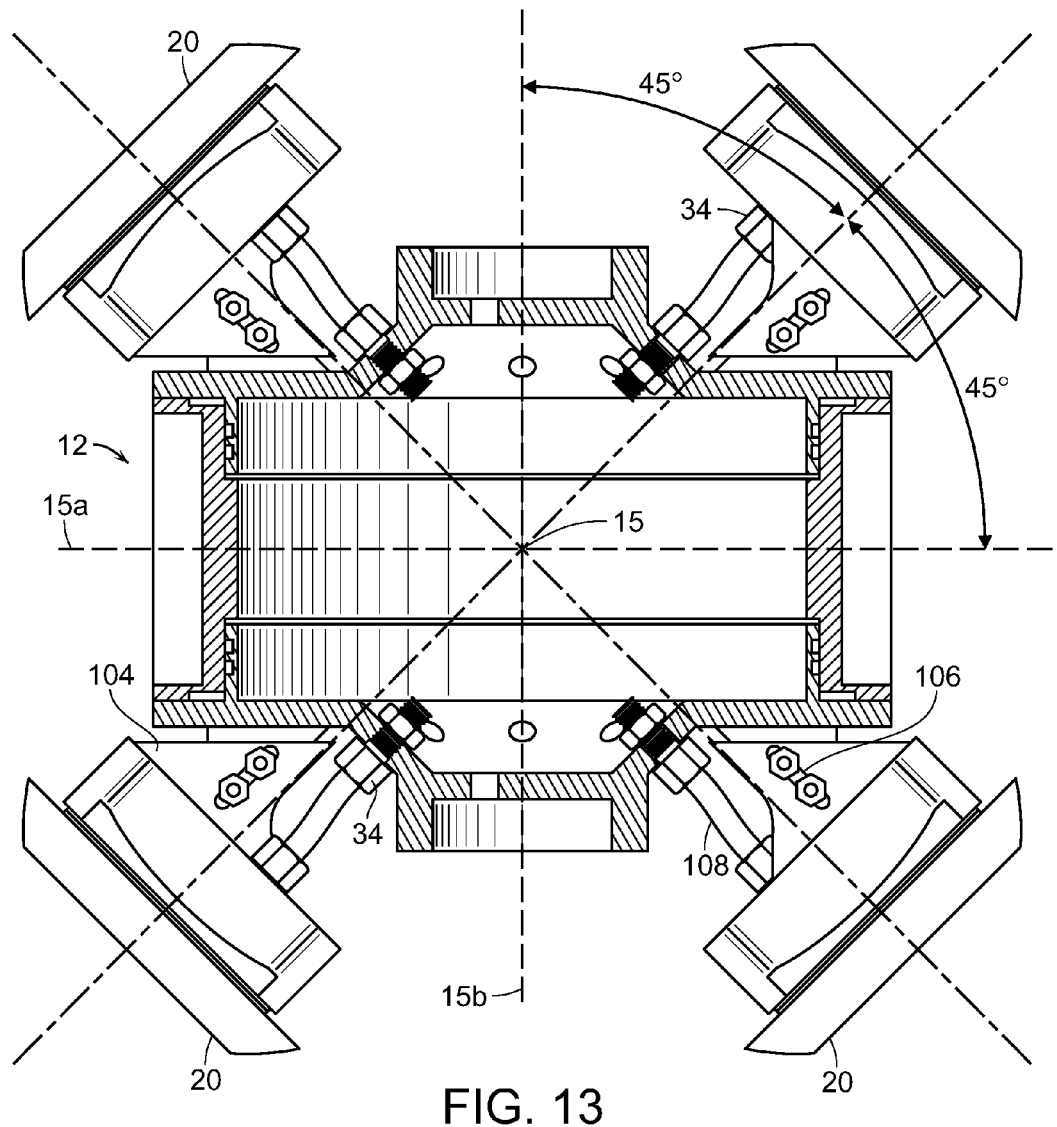
FIG. 13 is a cross-sectional side view of module four of the camera drone of the present invention.

FIG. 13 illustrates the assembly and attachment of an individual camera-light 20 to the stands 38 found on the main body module 12. This exploded view shows the preferred assembly of a single camera-light 20 and its location in relation to the cylinder cover 24 of the main body module 12. The main body module 12 is the main determining component that drives the size of the camera-light 20 based on camera and light requirements.

The camera-light 20 preferably consists of a camera support 88, a camera 90, a base body 92 that surrounds the camera 90, an LED board support 94 and an LED board 96, a sealing ring 98, a tempered glass shield 100, and a threaded cap 102. The LED board support 94 and LED board 96 preferably include a central opening 95 to allow the camera 90 a field of view through the same. The assembly of the camera support 88, the base body 92, the sealing ring 98, the tempered glass shield 100, and the threaded cap 104 house the camera 90 and LED board 96. The tempered glass shield 100 is used in front of the camera 90 and LED board 96.

The back of the camera support 88 includes a mounting bracket 104 that includes an adjustability slot 106 for receiving bolts or other securing devices to attach the mounting bracket 104 to the stands 38. The distance of each camera-light 20 from the center of gravity 15 of the main body module 12 can be adjusted by using the adjustability slots 106 to achieve precise positioning of each camera-light 20 while maintaining angular integrity. The camera support 88 with its mounting bracket 104 and adjustability slot 106 is the camera-light's 20 nesting base that mates with the stands 38 on the cylinder cover 22 and allows for adjustment of the distance of the camera from the center of gravity 15 of the camera drone 10.

A cable penetrator 34 passes through the camera support 88 to allow for passage of a camera cable harness 108. The camera cable harness 108 provides power and control wires to the camera-light 20 from the computer module 84 inside the cylindrical housing 22 via a cable penetrator 34 through the cover 24. All required camera and light wires contained in the camera cable harness 108 exit the camera-light 20 through the cable penetrator 34 and enter the cylindrical housing 22 via a separate cable penetrator 34 and connect to the computer module 84.

Each camera-light 20 of the camera-light module 18 is preferably constructed in a way such that it is completely sealed against water. This avoids damaging the components when the camera drone 10 is used as an underwater submersible device. Construction of the camera-light module 18 also takes advantage of material and part shape to use the surrounding environment as a heat sink.

The use of eight camera-lights 20 constitutes a preferred entire assembly necessary to produce eight images having viewing angles—ranging from one hundred twenty to one hundred eighty degrees—that are received by the computer module 84 and stitched together to produce a single three hundred sixty degree spherical view, suitable for virtual reality. Environmentally appropriate microphones 110 can also be included with each camera-light 20 of the camera-light module 18 to generate an accurate and realistic virtual surround sound.

Figure 14:
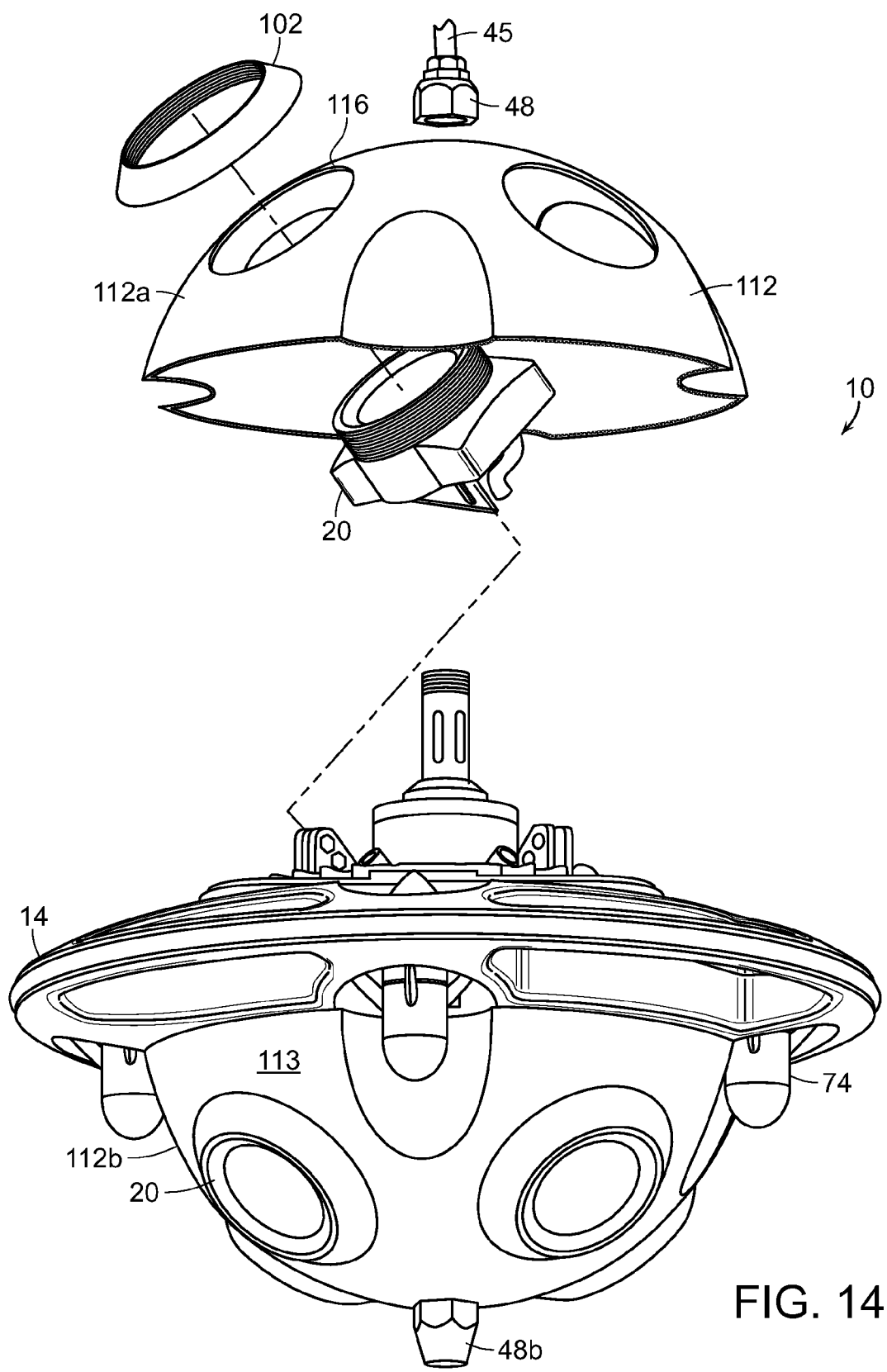
FIG. 14 is a partially exploded view of the camera drone of the present invention.

As shown in FIG. 14, upper and lower casings 112, each having a hemispherical shape, together provide an overall spherical shape to the camera drone 10 while protecting all components inside of it. The casing 112 define a generally spherical surface 113. The casings 112 are preferably held in place by shell retaining nuts 48 located on the upper and lower wire stems 26 that protrude through the casings 112. Each casing 112 has an appropriate number of camera openings 116 to permit passage of a threaded portion of the tempered glass shield 100 of the camera-light unit 20 which will protrude the casing 112 when assembled. The threaded cap 102 secured to the threaded portion of the tempered glass shield will complete the assembly. This method permits easy adjustment and maintenance access to all modules 12, 14, 16, 18.

Although several embodiments have been described in detail for purposes of illustration, various modifications may be made without departing from the scope and spirit of the invention. Accordingly, the invention is not to be limited, except as by the appended claims.

What is claimed is:

1. A modular camera drone, comprising:
    a first module comprising a hermitically sealed housing enclosing a computer processor;
    a pair of hemispherical shells disposed around the first module so as to define a generally spherical surface;
    a second module comprising a circular base unit encircling an equatorial region of the generally spherical surface and attached to the first module, wherein the second module includes a plurality of cavities holding a plurality of ballast tanks configured for the selective filling or emptying of a ballast fluid;
    a third module comprising a plurality of thrusters for generating propulsion, wherein the thrusters are disposed uniformly around a perimeter of and attached to the circular base unit;
    a fourth module comprising a plurality of camera-light units uniformly disposed around the generally spherical surface; and
    wherein power and control cables from the computer processor pass through the hermetically sealed housing to the second module, the third module, and the fourth module.

2. The modular camera drone of claim 1, wherein the camera drone is configured for operation in both air and water environments.

3. The modular camera drone of claim 2, further comprising a tether harness attached to the first module and comprising power and control supply cables passing through the hermetically sealed housing to the computer module and a ballast fluid supply cable passing through the hermetically sealed housing to the ballast tanks of the second module.

4. The modular camera drone of claim 2, further comprising a battery pack enclosed within the hermetically sealed housing and connected to the computer processor.

5. The modular camera drone of claim 1, further comprising gyroscope enclosed within the hermetically sealed housing and operationally connected to the computer module and the thrusters of the third module.

6. The modular camera drone of claim 1, wherein the fourth module comprises at least eight camera-light units disposed uniformly about the generally spherical surface so as provide a 360°×360° field of view around the camera drone.

7. The modular camera drone of claim 6, wherein each of the at least eight camera-light units include a microphone configured to record ambient surround sound.

8. The modular camera drone of claim 1, wherein each of the plurality of thrusters includes an electronic speed controller and is capable of generating thrust in both air and water environments.

9. The modular camera drone of claim 8, wherein the third module comprises at least four thrusters, each disposed at ninety degree intervals around the perimeter of the circular base unit relative to another thruster.

10. The modular camera drone of claim 1, wherein the second module comprises at least four separate and symmetrical ballast tanks disposed uniformly around the perimeter of the circular base unit.

11. The modular camera drone of claim 10, wherein each of the ballast tanks are configured to be filled with water drawn from a water environment, while releasing any air in the ballast tanks through an air-vent line.

12. The modular camera drone of claim 11, wherein each of the ballast tanks are configured to be filled with air drawn from a compressed air tank enclosed within the hermetically sealed housing forcing any water in the ballast tanks through a water flow valve.

13. The modular camera drone of claim 11, wherein each of the ballast tanks are configured to be filled with air drawn from a ballast fluid supply cable provided in a tether harness forcing any water in the ballast tanks through a water flow valve.

14. The modular camera drone of claim 1, further comprising a sensor disposed outside of the hermetically sealed housing, wherein the sensor is configured to measure one of temperature, pressure, depth, or altitude.

15. The modular camera drone of claim 14, wherein the sensor is disposed behind a strainer unit that permits the passage of an environmental fluid medium to the sensor.

16. The modular camera drone of claim 1, wherein the hermetically sealed housing includes a plurality of heat radiating fins disposed about a perimeter of the first module.

17. The modular camera drone of claim 1, wherein the computer processor is configured to process the images from each of the plurality of camera-light units and stitch them together to form a single 360° spherical field of view.

* * * * *